United States Patent [19]

Felix

[11] Patent Number: 4,887,265
[45] Date of Patent: Dec. 12, 1989

[54] PACKET-SWITCHED CELLULAR TELEPHONE SYSTEM

[75] Inventor: Kenneth A. Felix, Crystal Lake, Ill.

[73] Assignee: Motorola, Inc., Schaumburg, Ill.

[21] Appl. No.: 170,960

[22] Filed: Mar. 18, 1988

[51] Int. Cl.$^4$ ............................................... H04J 3/24
[52] U.S. Cl. ..................................... 370/94.1; 379/59;
455/33; 455/34; 455/54
[58] Field of Search ...................... 370/94, 95, 110.1;
379/59, 60; 455/33, 34, 54, 56

[56] References Cited

U.S. PATENT DOCUMENTS

| | | | |
|---|---|---|---|
| 4,268,722 | 5/1981 | Little et al. | 179/2 EB |
| 4,485,486 | 11/1984 | Webb et al. | 455/33 |
| 4,517,669 | 5/1985 | Freeburg et al. | 370/94 |
| 4,649,543 | 3/1987 | Levine | 371/41 |
| 4,670,899 | 6/1987 | Brody et al. | 455/33 |
| 4,696,027 | 9/1987 | Bonta | 379/60 |
| 4,704,734 | 11/1987 | Menich et al. | 455/33 |
| 4,726,050 | 2/1988 | Menich et al. | 379/60 |
| 4,737,978 | 4/1988 | Burke et al. | 455/33 |
| 4,748,681 | 5/1988 | Schmidt | 370/95 |

OTHER PUBLICATIONS

"Primer for the future ... Digital Technology", L. M. Ericsson Telephone Co., Jun. 1987.
"High Capacity DPN Packet Switch Architecture", D. S. Drynan, C. D. Woodman, Bell-Northern Research Ltd., 1987 IEEE.

Primary Examiner—Robert L. Griffin
Assistant Examiner—Wellington Chin
Attorney, Agent, or Firm—Rolland R. Hackbart

[57] ABSTRACT

A unique packet-switched cellular telephone system includes a cellular switch (140) and base sites (110) for providing packet-switched data services to cellular data telephones (102). Cellular switch (140) includes packet access points (152, 153) coupled to a packet network and T1 span lines (160, 161) coupled to the landline telephone network. Base sites (110) are coupled to cellular switch (140) by T1 span lines (164, 165) in which all time slots are clear channels and one time slot is dedicated for common channel signalling. Multiple data calls are assigned to each packet-mode radi channel thereby conserving valuable radio channel spectrum. Data calls are handed off from one packet-mode radio channel to another on the basis of cellular data telephone movement, signal strength, and/or bit-error rate, or on the basis of radio channel data packet capacity, data packet traffic, and/or data packet throughout.

16 Claims, 9 Drawing Sheets

FIG. 10

FIRST WORD 1001

| 1010 | 1011 | 1012 | 1013 | 1014 | 1015 | 1016 |
|---|---|---|---|---|---|---|
| 000/111 | 1/0 | NUMBER OF SEGMENTS | NUMBER OF WORDS PER SEGMENT | NUMBER OF LAST REC. SEGMENT | MOBILE ID | PARITY |

SUBSEQUENT WORDS 1002

| 1020 | 1021 | 1022 | 1023 |
|---|---|---|---|
| 1/0 | SEGMENT No. | DATA | PARITY |

PACKET-SWITCHED CELLULAR TELEPHONE SYSTEM

BACKGROUND OF THE INVENTION

The present invention is generally related to cellular telephone systems and more particularly to an improved packet-switched cellular telephone system having packet-switched radio channels.

In the prior art cellular telephone systems, a voice channel is assigned for the duration of a telephone call between two parties. Since both parties are continuously listening, either can ascertain that the discussions have been terminated and hang up, thereby freeing up the voice channel for another call. Similarly, when making a data call on such prior art cellular telephone systems, a voice channel is assigned for the duration of each data call. However, data calls may include long periods of inactivity during which a radio channel is needlessly tied up. As a result, radio channel spectrum is wasted and data calls are relatively expensive. Accordingly, there is a need for an improved packet-switched cellular data telephone system for efficiently accommodating data calls.

OBJECTS OF THE INVENTION

Accordingly, it is an object of the present invention to provide an improved packet-switched cellular telephone system for accommodating multiple data calls on each packet-switched radio channel, thereby conserving radio channel spectrum.

It is another object of the present invention to provide an improved packet-switched cellular telephone system having a plurality of packet-switched radio channels each providing packet-switched data services to a plurality of cellular data telephones.

It is yet another object of the present invention to provide an improved packet-switched cellular telephone system having a plurality of packet-switched radio channels wherein data calls may be handed off from one packet-switched radio channel to another on the basis of cellular data telephone movement, signal strength, and/or bit-error rate, or on the basis of radio channel data packet capacity, data packet traffic, and/or data packet throughput.

BRIEF DESCRIPTION OF THE DRAWINGS

FIG. 10 shows the structure of messages communicated on radio channels of the packet-switched cellular telephone system in FIG. 1.

DESCRIPTION OF THE PREFERRED EMBODIMENT

Figure 1:
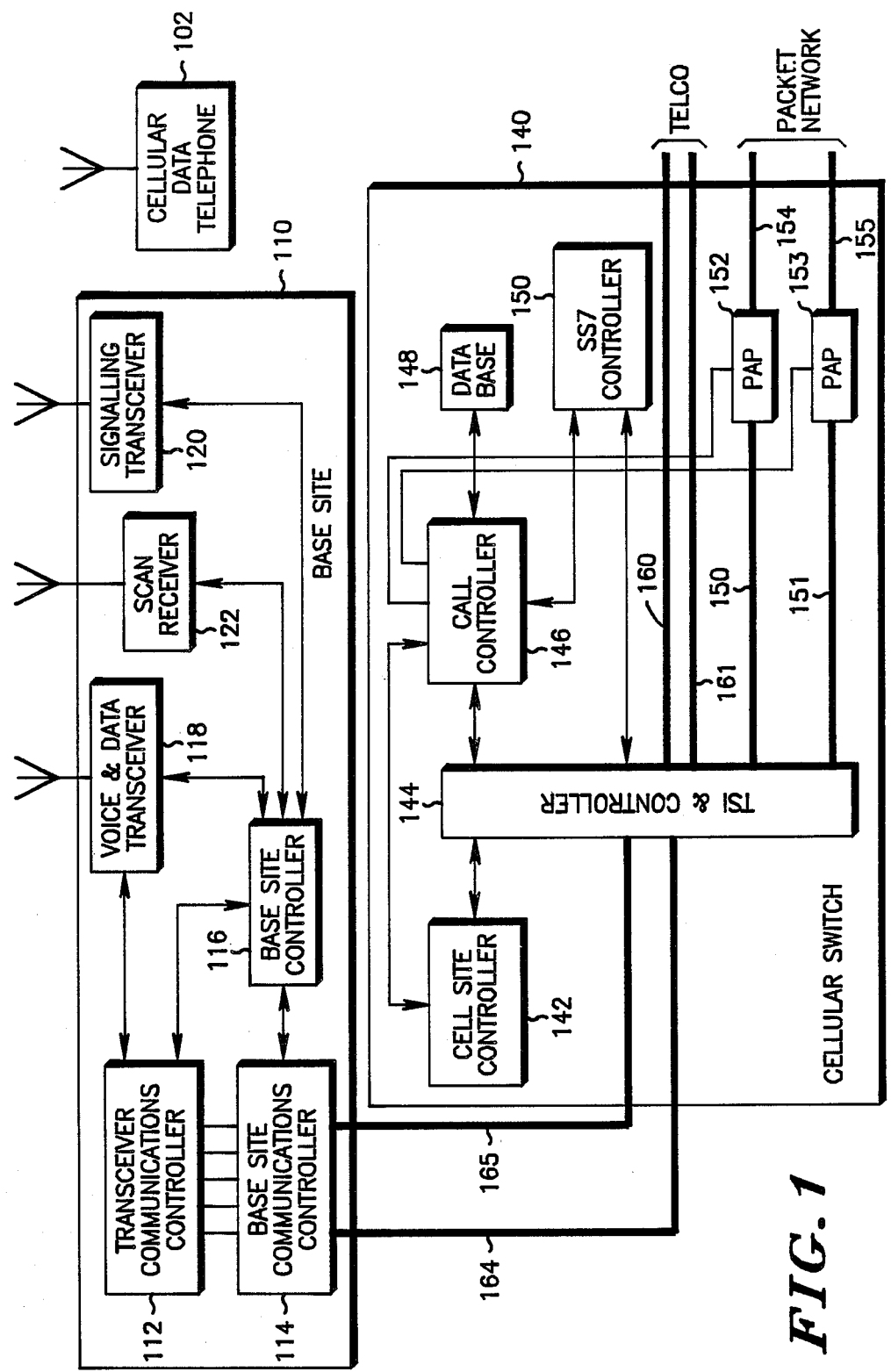
FIG. 1 is a block diagram of a packet-switched cellular telephone system that may advantageously utilize the present invention.

In FIG. 1, there is illustrated a block diagram of a packet-switched cellular telephone system that may advantageously utilize the present invention to provide cellular data services to cellular data telephones (CDTs) 102. According to a feature of the present invention, several CDTs 102 may be assigned to the same radio channel, thereby conserving valuable radio channel spectrum. Furthermore, this and other features of the present invention can also be utilized in landline telephone systems.

The packet-switched cellular telephone system in FIG. 1 includes a cellular switch 140, a plurality of base sites 110 and a plurality of CDTs 102. Each base site 110 has a plurality of voice and data radio channels and at least one signaling radio channel for providing voice and data telephone services in a corresponding cell of the cellular telephone system. The specifications and signaling protocols for the packet-switched cellular telephone system in FIG. 1 are similar to those for cellular telephone systems in the U.S.A. are set forth in specification IS-3-D by the Electronic Industries Association (2001 Eye Street, N.W., Washington, D.C., U.S.A. 20006) and are related to those for digital cellular telephone systems in Europe set forth in the specifications published by the Special Mobile Group (GSM formed by the European Conference of Ports and Telecommunication for specifying pan-European digital cellular systems).

Base site 110 in FIG. 1 includes a signaling transceiver 120 for transceiving supervisory call information on a signaling radio channel, a scan receiver 122 for scanning radio channels; a plurality of voice and data transceivers 118 each operable on a different radio channel; a base site controller 116 for controlling transceivers 118, 120 and 122; a transceiver communications controller 112 for controlling data communications over transceivers 118; and a base site communications controller 114 for controlling information data communications between base site 110 and cellular switch 140. Base site 110 may be a base site of the type described in U.S. Pat. Nos. 4,485,486, 4,707,734 and 4,726,050 or a commercially available "DYNATAC" base station manufactured and sold by Motorola, Inc. and described in further detail in Motorola instruction manual no. 68P81069E10 entitled "DYNATAC LD Base", and available from Motorola C&E Parts, 1313 East Algonquin Road, Schaumburg, Ill. 60196, U.S.A.

CDTs 102 in FIG. 1 may be commercially available cellular telephones including a data terminal and a cellular modem, such as that shown and described in U.S. Pat. No. 4,697,281. In particular, CDTs 102 may be a cellular telephone of the type shown and described in U.S. Pat. No. 4,649,543 and may include a "DYNA-TAC" cellular telephone transceiver manufactured and sold by Motorola, Inc. and described in further detail in Motorola instruction manual no. 68P81070E40, entitled "DYNATAC Cellular Mobile Telephone", and available from Motorola C&E Parts, 1313 East Algonquin Road, Schaumburg, Ill. 60196, U.S.A.

Cellular switch 140 includes cell site control processor 142 for controlling base sites 110; call control processor 146 for controlling telephone call originations, terminations and disconnections; data base 148 for storing CDT telephone numbers and corresponding call features; signaling system no. 7 (SS7) control processor 150 for controlling communications between cellular switch 140 and the landline telephone network (telco) and other cellular switches; packet access points (PAPs) 150 and 151 for communicating data packets between CDTs 102 and the data packet network; and time-slot interchange (TSI) and controller 144 for switching information and control data between cell sites 110, cell site control processor 142, call control processor 146, SS7 control processor 150, T1 span lines 160 and 161, and PAPs 150 and 151.

Cellular switch 140 including blocks 142, 144, 148 and 150 may be a cellular switch of the type described in U.S. Pat. No. 4,268,722 or one of the commercially available "EMX" cellular switches manufactured and sold by Motorola, Inc. and described in further detail in Motorola instruction manual nos. 68P81055E20 entitled "EMX 2500" and 68P81052E10, entitled "EMX 250/500", and available from Motorola C&E Parts, 1313 East Algonquin Road, Schaumburg, Ill. 60196, U.S.A.

PAPs 152 and 153 may be implemented as described in the paper entitled "High Capacity DPN Packet Switch Architecture", by D. S. Drynan and C. D. Woodman and published in the Conference Record for the IEEE/IEICE Global Telecommunications Conference, held Nov. 15–18, 1987 in Tokyo, Japan, Volume 3, at pp. 1771–1776. Cellular radio channels assigned to packet-mode operation are connected to PAPs 152 and 153 by TSI and controller 144 by way of trunks or ports 150 and 151, respectively. The maximum number of cellular radio channels which can be assigned to PAPs 152 and 153 is determined by the number of ports 150 and 151, respectively, which are terminated at each PAP. Consequently, the number of CDTs 102 active on a PAP 152 or 153 at one time is a function of the number of ports 150 or 151, respectively, and the amount of traffic generated to and from the CDTs 102.

Lines 164 and 165 are 1,544K bits per second T1 span lines which interconnect base site 110 and cellular switch 140. These T1 span lines are implemented as described in CCITT Document G.733 with the following two exceptions: (1) all time slots are clear channels i.e., the time slots do not contain any trunk signaling information; and (2) one time slot (in each direction) is dedicated for common channel signaling. The protocol for the common channel signaling can be based on signaling system 7 (CCITT Q.701-Q.774) or any other suitable conventional protocol.

Lines 160 and 161 are 1,544K bits per second T1 span lines which interconnect cellular switch 140 with the telco and other cellular telephone switches. These TI span lines are implemented as described in CCITT Document G.733.

In other parts of the world, T1 span lines 160 and 161 may be implemented as described in the CCITT documents relating to thirty-two channel pulse-code modulation. In this implementation, channel sixteen is always set aside as the common signaling channel.

In a CDT originated call, call supervisory information is passed from the CDT 102 via signaling transceiver 120 to base site controller 116. Base site controller 116 examines the origination request and assigns CDT 102 to a radio channel which is currently being used for packet-mode operation or assigns the CDT 102 to a previously idle radio channel. Base site controller 116 then sends a message to the call controller 146 of cellular switch 140 containing information as to the identity of CDT 102, the described destination (called number), the packet-mode radio channel assigned to CDT 102, and which line 164 or 165 and time slot thereof to use.

Referring to FIG. 10, there is illustrated the structure of the first word 1001 and the subsequent words 1002 of segments of messages communicated on the radio channels between base site transceivers 118 and CDTs 102. A message includes a number of segments each including first words 1001 followed by a number of subsequent words 1002. First word 1001 includes seven fields 1010–1016. Field 1010 includes three bits which are "000" for outbound messages and "111" for inbound messages. Field 1011 includes one bit which is a "1" if the last segment was successfully received and a "0" if the last segment was not successfully received. Field 1012 is a multi-bit field indicating the number of segments in the message. Field 1013 is a multi-bit field indicating the number of words per segment. Field 1014 is a multi-bit field indicating the number of the last segment. Field 1015 is a multi-bit field indicating the mobile identification number. Field 1016 is a multi-bit field indicating the parity of all bits of this word according to a pre-selected parity code. Similarly, subsequent words 1002 of a segment include four fields 1020–1023. Field 1020 includes one bit which is a "1" if this is not the last word of a segment and a "0" if this is the last word of a segment. Field 1021 is a multi-bit field indicating the number of this segment. Field 1022 is a multi-bit field indicating the information data or control data being communicated. Lastly, field 1023 is a multi-bit field indicating the parity of all bits of this word according to the pre-selected parity code. Words of messages are coded and decoded by channel processors 211–213 of base site 110.

In a CDT originated call, call supervisory information is passed to call controller 146 which, in turn, sets up the path to the PAP 152 or 153. Once established, conventional link set up procedures are used to establish the packet circuit conversation. Since PAPs 152 and 153 are concentration points which multiplex information onto, and de-multiplex information from the packet network, and because packet traffic is bursty in nature, the cellular radio channel may be used as an additional concentration point for packet-switched traffic. This unique feature of the present invention can be done by multiplexing multiple CDTs 102 onto the same cellular radio channel for accessing the same packet network. According to another feature of the present invention, radio channels need not be set aside for only for packet data services. Instead, all radio channels can be used for voice, dedicated data or packet-switched data. If the channel is used for data, either dedicated or packet-switched, the speech processing elements are removed from the data path.

In CDT terminated call, call supervisory information is passed to the PAP 152 or 153 from the packet network. PAP 152 or 153 passes the call supervisory information to call controller 146 and then to cell site controller 142 which formulates the page message for a data call and sends it to the TSI and controller 144 which inserts the page message into the common channel signaling time slot of line 164 or 165. Base site controller 116 receives the call supervisory information and passes it to the signaling transceiver 120 which transmits the page message. If the paged CDT 102 detects the page message, it responds with a page acknowledgement message and is then assigned a packet-mode radio channel by base site controller 116 via signaling transceiver 120. CDT 102 then retunes its transceiver to the assigned packet-mode radio channel 118 and receives the link set up messages from PAP 152 or 153. Upon detection of the link set-up messages from PAP 152 or 153, CDT 102 proceeds with packet-mode operations in accordance with the protocol of the particular PAP. CCITT X.25 LAPB protocol is one such protocol suitable for this purpose.

Outbound access to CDT 102 is controlled by the transceiver communications controller 112. Information data (B channel) intended for CDT 102 are received by base site communications processor 231 via data send/receive processor 232 from cellular switch 140 by way of the packet network. Control data (D channel) intended for CDT 102 can be generated at base site controller 116 or can be generated at cellular switch 140. That control data generated at cellular switch 140 is sent from call controller 146 or cell site controller 142 by way of the common signaling channel to base site communications processor 231. Base site communications processor 131 queues the information data in outbound "B" channel packets 301 or 305, queues the control data in outbound "D" channel packets in channel data buffer 221, 222 or 233. The corresponding channel processor 211, 212 or 213 pulls the information in these buffers 221, 222 and 223 and places the information into the data portion of the signaling protocol for transmission by transceivers 201, 202 or 203.

Packet traffic to CDTs 102 on packet-mode radio channels is queued and controlled by transceiver communications controller 112. The messages transmitted between CDT 102 and base site transceivers 118 and 120 are similar to these described in the aforementioned EIA document IS-3-D. However, control information must be inserted into packets at base site 110 since some of the control information, such as handoff information, will be generated at base site 110. Therefore, according to a feature of the present invention, queuing will be most efficiently performed at base site 110. The important point here is that outbound packet traffic is ordered and contention free.

Inbound access to the packet-mode radio channels, however, is more complex as several CDTs 102 sharing the same packet-mode radio channel may want simultaneous access. For inbound access, CDTs 102 can operate in one of three modes: (1) polled mode; (2) contention mode; or (3) mixed contention and polled mode. In the polled mode, base site 110 and PAPs 152 and 153 have knowledge of which CDTs 102 have been assigned to packet-mode radio channels since the packet-mode call set up has been performed over the signaling channel. Hence base site 110 can poll the CDTs thereby controlling when they can access the cellular telephone system. If CDTs 102 have nothing to send, they simply send back a packet indicating this. In all likelihood, minimum length packets from each CDT 102 would contain CDT received bit-error rate information. These inbound packets would also allow base site 110 to monitor each CDT's signal strength and/or bit-error rates on the inbound packet-mode radio channel.

In the contention mode, inbound packets must contain some form of identification of the corresponding CDT 102. This can be the CDT's actual identification number or it can be formed through some relationship with the virtual circuit connection. An important feature of any contention-mode protocol is the use of the busy/idle bits on the cellular signaling channel. The busy/idle bits would be constantly monitored and acted upon by CDTs 102 when an undesired condition is detected in a manner like that of the forward and reverse signaling channels. In the contention mode, CDTs 102 would access the packet-mode radio channel when they sense that it is free and would use the appropriate backoff algorithms in the event of perceived collisions.

In a combined mode of contention and polling, CDTs 102 normally operate in the contention mode. However, if nothing is inbound on the packet-mode radio channel, base site 110 may send a system information message on the packet-mode data channel indicating that it is entering the polling mode and ask a particular CDT 102 to call in. An immediate response by the polled CDT 102 would indicate to base site 110 that the cellular telephone system is indeed operational and not tied up due to contention. If polled CDT 102 does not respond, base site 110 may request another CDT to respond. If that CDT does not respond, there may be a malfunction in the packet-mode radio channel, and base site controller 116 then goes through fault data alarm procedures.

In the inbound direction, control and information data is received by transceiver 201, 202 or 203 and sent to the corresponding channel processor 211, 212 or 213. The channel processor 211, 212 or 213 buffers the information data in the inbound B channel packets 303 in channel data buffer 221, 222 or 223, and the control data in the inbound D channel packets 304 in channel data buffer 221, 222 or 223 or the base site inbound control packet 402, 405 or 407 in base site controller data buffer 225. Base site communications processor 231 and the base site control processor 215 pull the information from the buffers 221–223 and 225, respectively. Base site communications processor 231 send this information to cellular switch 140 and base site control processor 215 acts on the received control data.

In the packet-switched cellular telephone system in FIG. 1, packet-mode data may be encoded differently from dedicated-mode data. In the dedicated mode, data in the B channel and D channel is typically interleaved. However, in the packet mode, data does not have to be, and in this implementation is not interleaved, and it is further identified as either information data or control data. For example, when CDT 102 sends messages concerning the packet-mode radio channel (e.g. received bit error rate, request for a handoff, poll responses, etc.), the message is encoded to indicate that it contains control information. Consequently, such a message may be simply received intact and processed by base site 110. If, however, the message is information data to be routed to PAP 152 or 153 and coupled to the packet network, the message is encoded to indicate that it contains information data.

Since CDT traffic is being multiplexed on packet-mode radio channels, it is always possible that CDT 102 may lose contact with base site 110 while another CDT is transmitting. Therefore, CDT 102 may include the capability of requesting on the cellular signaling channel of another base site that it be reconnected with the corresponding PAP 152 or 153. Cellular switch 140, having stored the previous routing information for CDT 102, may handoff CDT 102 to the new base site and reconnect it to the corresponding PAP 152 or 153. CDT 102 receives the new packet-mode radio channel assignment by means of a reconnect message. This feature of the present invention may be advantageously utilized in both the packet mode and the dedicated mode of operation.

Figure 2:
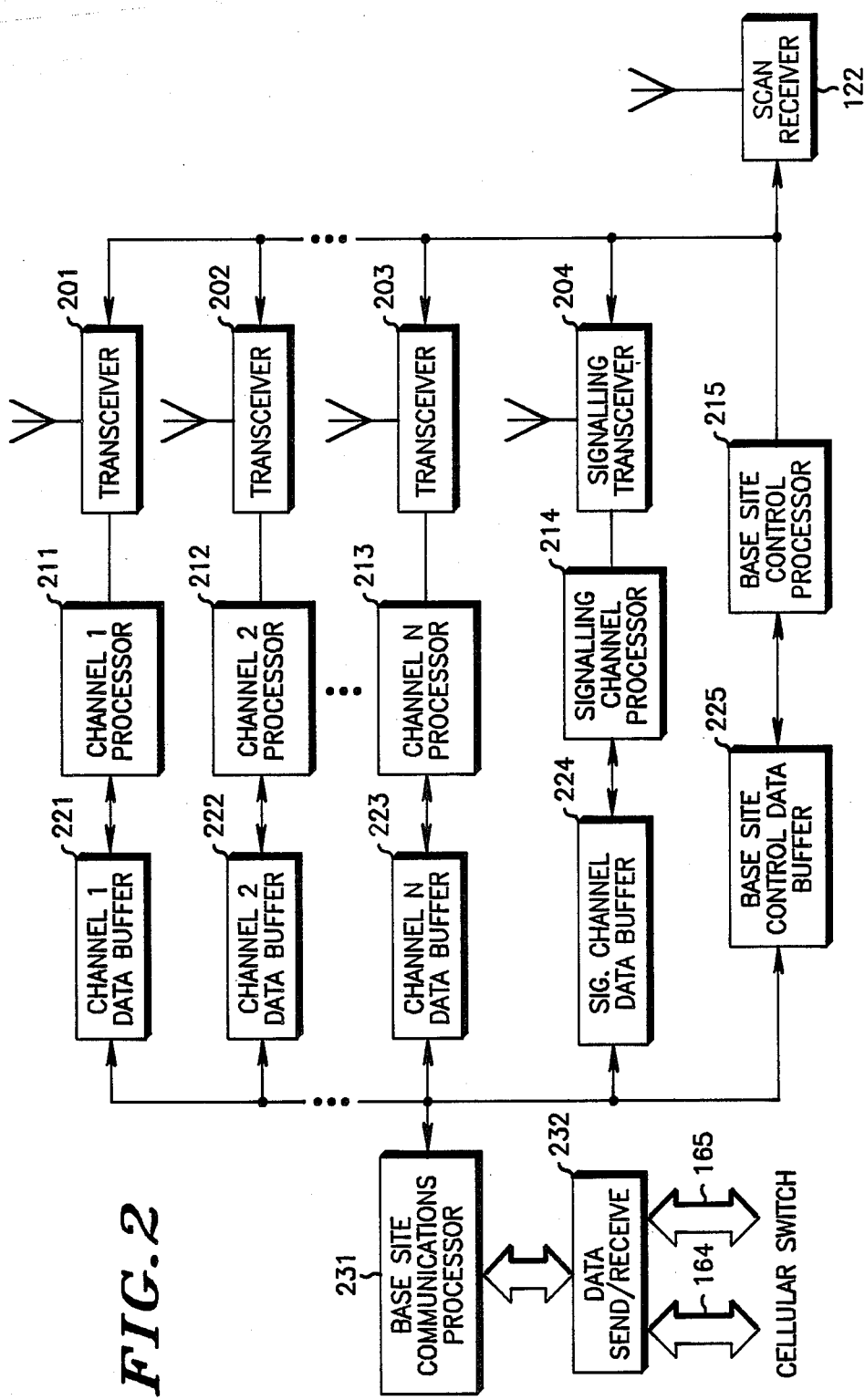
FIG. 2 is a detailed block digram of base site 110 in the packet-switched cellular telephone system in FIG. 1.

Referring to FIG. 2, there is illustrated a detailed block diagram of base site 110 in the packet-switched cellular telephone system in FIG. 1. Base site 110 includes base site communications processor 231, data send/receive processor 232, voice and data transceivers 201-203, channel processors 211-213, channel data buffers 221-223, signaling transceiver 204, signaling channel processor 214, signaling channel data buffer 224, scan receiver 122, base site control processor 215, and base site control data buffer 225. Information and control packets are communicated between base site 110 and cellular switch 140 over lines 164 and 165. Packets received by data send/receive processor 232 are coupled to and stored in the appropriate buffer 221-225 by base site communications processor 231. Similarly, packets in buffers 221-225 for cellular switch 140 are read out and coupled by base site communications processor 231 to data send/receive processor 232 for transmission to cellular switch 140 and/or base site control processor 215. B channel data packets contain voice or digital information, and D channel data packets contain supervisory and/or control information.

Figure 3:
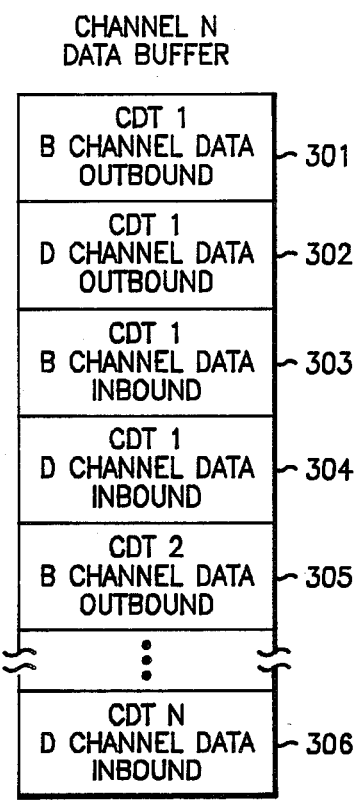
FIG. 3 is an exploded view of channel data buffers 221-223 in FIG. 2.
Figure 11:
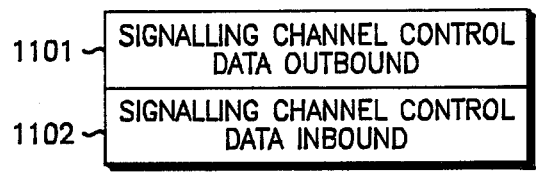
FIG. 11 is an exploded view of signaling channel data buffer 224 in FIG. 2.
Figure 4:
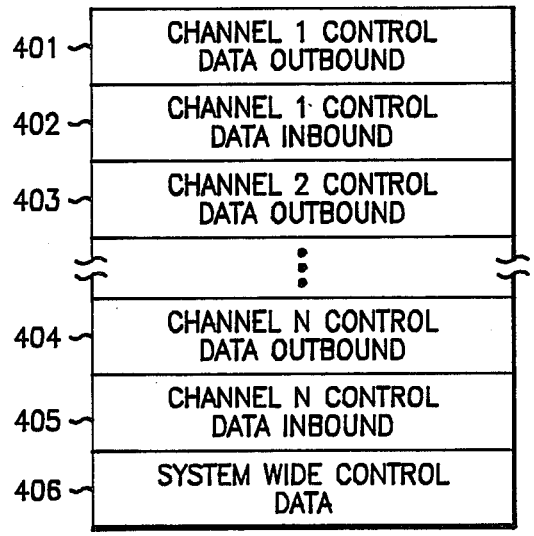
FIG. 4 is an exploded view of base site control data buffers 225 in FIG. 2.

Referring next to FIGS. 3, 4 and 11, there is illustrated an exploded view of buffer memory areas for data packets in the channel data buffers 221-223, buffer memory areas for data packets in the base site control data buffer 225, and buffer memory areas for data packets in the signaling channel data buffer 224, respectively. Buffers 221-225 may be dual-port memories of the type shown and described in U.S. Pat. No. 4,594,657. The channel data buffer 223 in FIG. 3 includes packets in memory areas 301-306 communicated between base site communications processor 231 and the corresponding channel processor 213. For each cellular data telephone 102, e.g. CDT no. 1, for which a call is in process, there are four memory areas in the channel data buffer in FIG. 3, i.e. B channel data outbound 301, D channel data outbound 302, B channel data inbound 303, D channel data inbound 304. As explained hereinabove, B channel data packets contain voice or digital information, and D channel data packets contain supervisory and/or control information.

The base site control data buffer 224 in FIG. 4 includes packets in memory areas 301-306 communicated between base site communications processor 231 and base site control processor 215. For each channel transceiver 201-203 and for signaling transceiver 204, there are two memory areas in the channel data buffer in FIG. 4, i.e. channel 1 control data outbound 401, channel 1 control data inbound 402, channel 2 control data outbound 403, channel N control data outbound 404, and channel N control data inbound 405. There is one additional memory area 406 containing system wide control data packets for all transceivers 201-204.

The signal channel data buffer 224 in FIG. 11 includes packets in memory areas 1101 and 1102 communicated between base site communications processor 231 and signaling channel processor 214. In this case, outbound packets in area 1101 may include page messages and channel assignments for CDTs 102 and inbound packets in area 1102 may include CDT origination messages and CDT registration messages.

Figure 5:
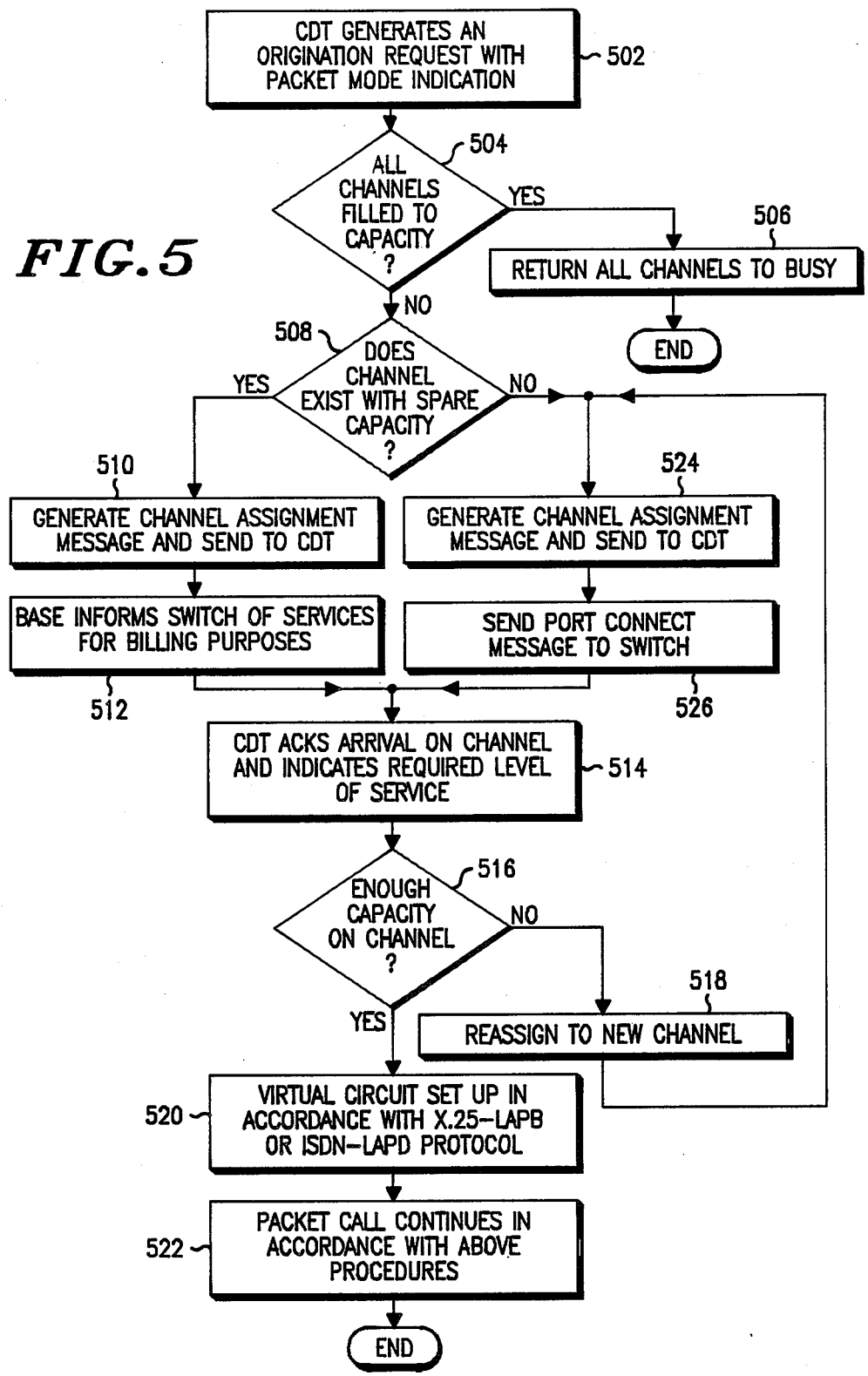
FIG. 5 is a flow chart for the process used by the cellular data telephone 102 and base site 110 in FIG. 1 for originating packet-mode call.

Referring to FIG. 5, there is illustrated a flow chart for the process used by the CDT 102 and base site 110 in FIG. 1 for originating a packet-mode call. Entering at block 502, CDT 102 generates a call origination request with a packet mode indication. When used for dedicated data or packet-switched data, the speech processing elements must be removed from the speech path. To make this feasible, a data call indicator is needed in the call origination request. In the packet-switched cellular telephone system in FIG. 1, CDTs access PAPs 152 and 153 by sending a packet-mode origination request message identifying the desired PAP e.g. 152 on an inbound (forward) set up signaling channel and receives a packet-mode radio channel assignment reply on the outbound (reverse) set up signaling channel.

Upon reception of the packet-mode origination request word from CDT 102 at base site 110, a check is made at decision block 504 to determine if a packet-mode radio channel with spare capacity and connected to PAP 152 is available. If so, YES branch is taken to block 510 where a packet-mode radio channel assignment message is generated and sent to CDT 102. Next at block 512, base site 110 informs cellular switch 140 that CDT 102 is in the packet mode for billing purposes.

Returning to decision block 508, if a packet-mode radio channel with spare capacity is not available, NO branch is taken to block 524 where a new radio channel is assigned to packet-mode operation, and a packet-mode radio channel assignment message is generated and sent to CDT 102. Next at block 526, base site 110 sends a port connect message to cellular switch 140 for connecting the new packet-mode radio channel to the requested PAP 152 and informs cellular switch 140 that CDT 102 is in the packet mode for billing purposes.

Next, program control proceeds from blocks 512 and 514 to block 514, where CDT 102 acknowledges arrival on the assigned packet-mode radio channel and indicates the required level of packet service. Then, at decision block 516, a check is made at base site 110 to determine if there is enough capacity on the assigned packet-mode radio channel for the level of packet service required by CDT 102. If not, NO branch is taken back to block 524 to assign a new radio channel to packet-mode operation. If there is sufficient capacity on the assigned packet-mode radio channel, YES branch is taken from decision block 516 to block 520 where a virtual circuit is set up in accordance with X.25-LAPB or another suitable signaling protocol, which is used by the packet network coupled to PAP 152. For example, if the packet network is an X.25 network, CDT 102 would begin by setting up a link connection and then generating a virtual link connection. Next, at block 522, the packet call continues in accordance with the above procedures; and thereafter the process of FIG. 5 ends.

Figure 6A:
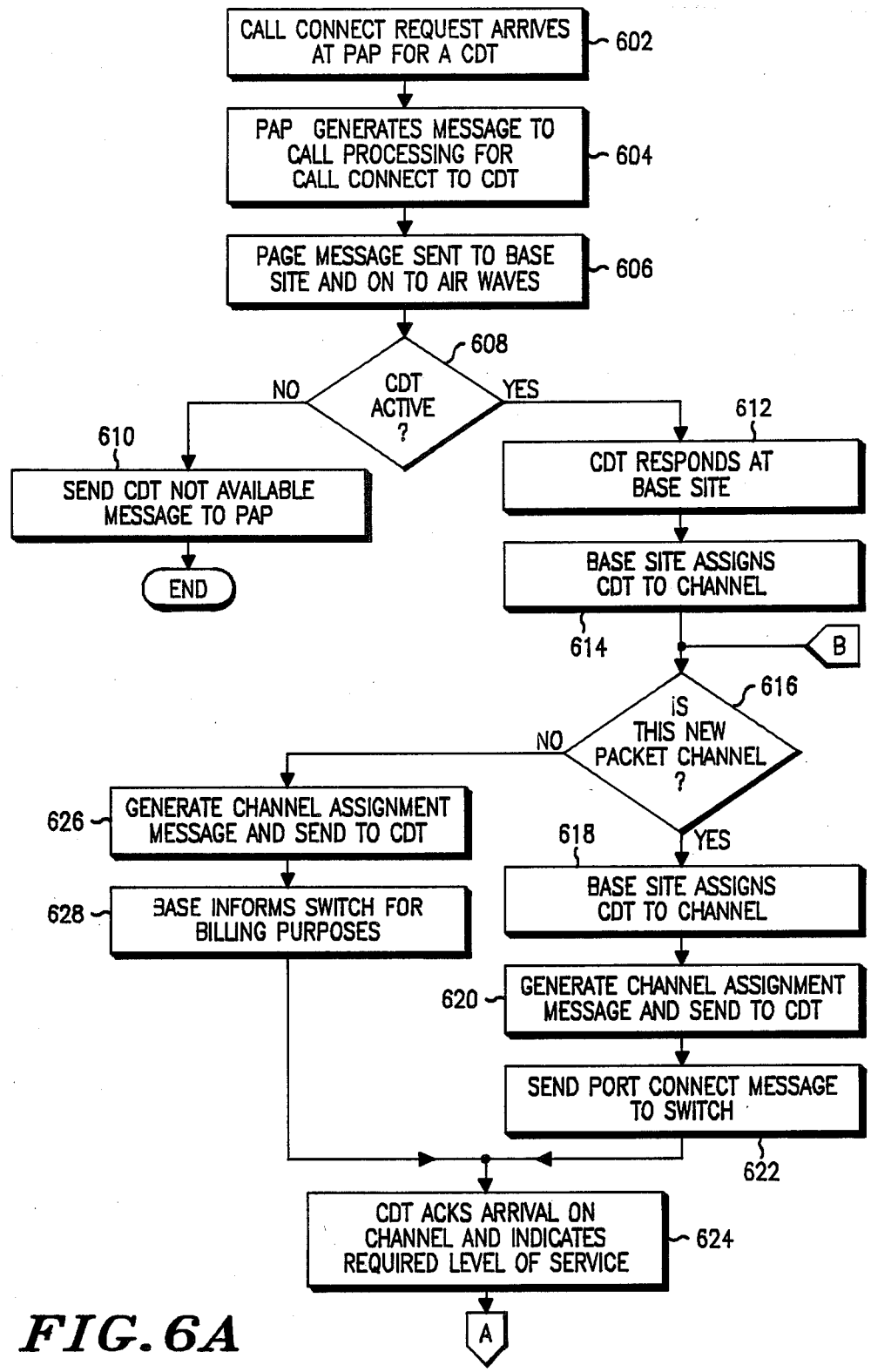
FIGS. 6A and 6B are flow charts for the process used by the packet access points 152 and 153 in FIG. 1 for terminating a packet-mode call to cellular data telephone 102.
Figure 6B:
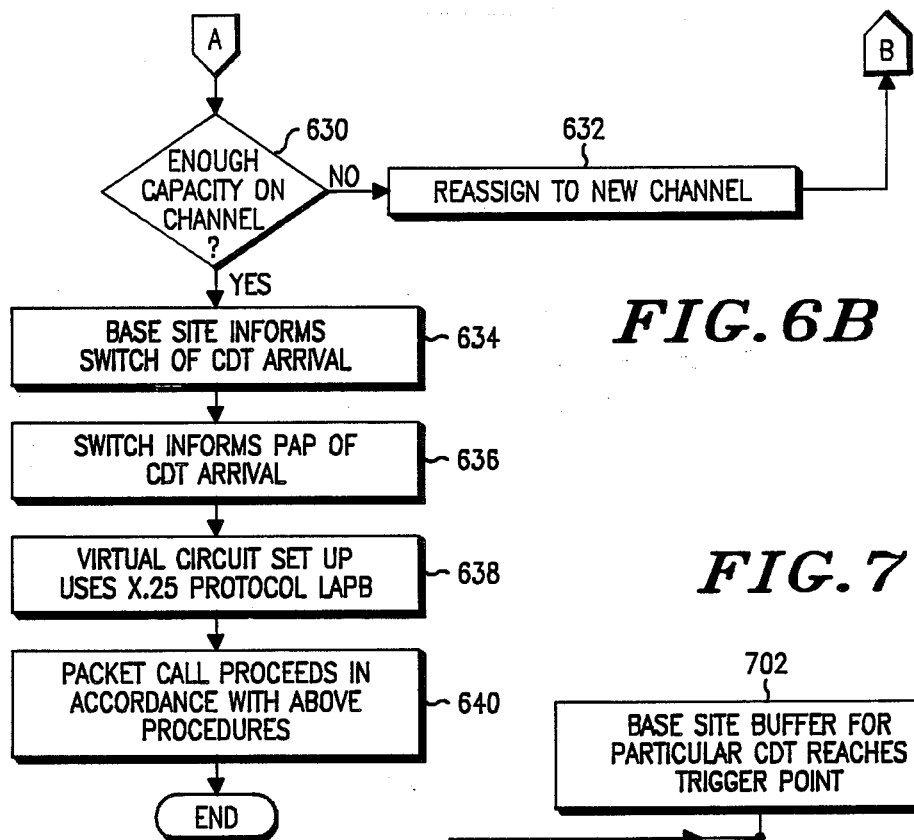

Referring to FIG. 6, there is illustrated a flow chart for the process used by the PAPs 152 and 153 in FIG. 1 for terminating a packet-mode call to CDT 102. Entering at block 602, a call connect arrives at PAP e.g. 152 for a CDT e.g. 102. Next, at block 604, PAP 152 generates a message to call control processor 146 for call connect to CDT 102. Then, at block 606, a page message for CDT 102 is sent to base site 110 and transmitted on the signaling channel by signaling transceiver 204. CDT 102, upon recognition of the page message, acknowledges the page message over the inbound signaling channel and awaits information regarding a voice and data channel. The page message may be a conventional cellular paging message which includes an packet-mode indicator.

Proceeding to decision block 608, a check is made to see if the paged CDT 102 is active. If not, NO branch is taken to block 610, where a message is sent by call control processor 146 to PAP 152 indicating that CDT 102 is not available; and thereafter the process of FIG. 5 ends. If CDT 102 is active, YES branch is taken from decision block 608 to block 612, where the response of CDT 102 to the page message is received at base site 110. Next, at block 614, base site 110 assigns CDT 102 to a packet-mode radio channel. Then, at decision block 616, a check is made to determine if the assigned packet-mode radio channel is new. If not, NO branch is taken to block 626, where a channel assignment message is generated and sent to CDT 102. Next, at block 628, base site 110 informs cellular switch 140 that CDT 102 is in the packet mode for billing purposes.

Returning to decision block 616, if the assigned packet-mode radio channel is new, YES branch is taken to block 618, where a new radio channel is assigned to packet-mode operation. Next, at block 520, a packet-mode radio channel assignment message is generated and sent to CDT 102. Next at block 622, base site 110 sends a port connect message to cellular switch 140 for connecting the new packet-mode radio channel to the requested PAP 152 and informs cellular switch 140 that CDT 102 is in the packet mode for billing purposes.

Next, program control proceeds from blocks 628 and 622 to block 624, where CDT 102 acknowledges arrival on the assigned packet-mode radio channel and indicates the required level of packet service. Then, at decision block 630, a check is made at base site 110 to determine if there is enough capacity on the assigned packet-mode radio channel for the level of packet service required by CDT 102. If not, NO branch is taken to block 632 and then back to block 616 to assign a new radio channel to packet-mode operation. If there is sufficient capacity on the assigned packet-mode radio channel, YES branch is taken from decision block 630 to block 634, where base site 110 informs call control processor 146 of arrival of CDT 102 on the assigned packet-mode radio channel. Then, at block 636, call control processor 146 informs PAP 152 of the arrival of CDT 102 on the assigned packet-mode radio channel. Next, at block 638, a virtual circuit is set up in accordance with X.25-LAPB or another suitable signaling protocol, which is used by the packet network coupled to PAP 152. For example, if the packet network is an X.25 network, CDT 102 would begin by setting up a link connection and then generating a virtual link connection. Next, at block 640, the packet call continues in accordance with the above procedures; and thereafter the process of FIG. 6 ends.

Handoff of a particular CDT 102 from one packet-mode radio channel to another may occur due to insufficient signal strength, insufficient capacity of the packet-mode radio channel, or degradation in bit-error rate. Handoffs due to the anticipation of insufficient signal strength from CDT 102 may be handled in substantially the same manner handled in conventional cellular telephone systems. In the case of bit-error rate, handoffs are handled in a different manner. According to the feature of the present invention, a handoff is initiated in response to degradation in bit-error rate even though signal strength is at or exceeding an otherwise adequate level. Thus, CDT 102 is handed off when its signal strength is below an adequate level or its bit-error rate is above a predetermined minimum bit rate.

Measurements of signal strength or bit-error rate may be performed by transceivers 201–203 of cell site 110 for each CDT 102 while that CDT is transmitting. By means of scan receiver 122, additional measurements may be made when desired by polling each CDT 102. CDT 102, in addition to base site 110, may monitor channel quality thru bit-error rate and/or signal strength measurements and transmit those measurements to base site 110 in messages being sent for other purposes. Taking such measurements at CDT 102 is advantageous since CDT 102 can can constantly monitor the packet-mode radio channel, while base site 110 is only able to monitor CDT 102 while it is transmitting.

Handoffs due to insufficient capacity or overloading of a packet-mode radio channel may be made by directing a CDT 102 to another packet-mode radio channel in use at base site 110 or by assigning an idle radio channel to packet mode operation and directing a CDT 102 to the new packet-mode radio channel. Handoffs due to a change in condition from stationary to moving are also possible. A moving CDT 102 may be monitored more frequently than a stationary one by base site 110 to make sure that the moving CDT 102 is on a more lightly loaded packet-mode radio channel. In addition, a moving CDT 102 may require a greater signal strength level in order to reliably access the cellular telephone system. If a moving CDT 102 can not obtain sufficient signal strength by handoff to a stronger or more lightly load packet-mode radio channel, a message may be sent by base site 110 to CDT 110 indicating this. The moving CDT 102 may then be parked and the packet-mode call continued or another packet-mode call originated.

Figure 7:
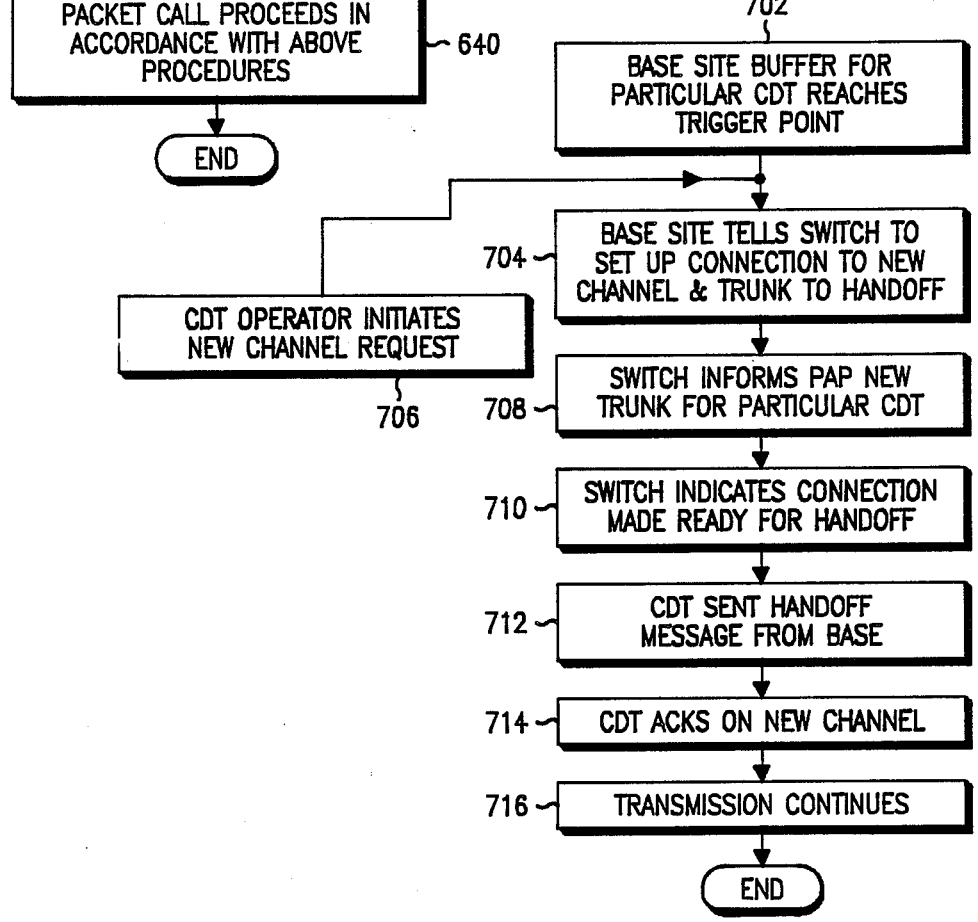
FIG. 7 is a flow chart for the process used by the cell site control 142 in FIG. 1 for controlling handoff of a packet-mode call due to lack of capacity on a packet-mode radio channel.

Referring to FIG. 7, there is illustrated a flow chart for the process used by the base site 110 in FIG. 1 for controlling handoff of a packet-mode call due to lack of capacity on a packet-mode radio channel. Entering at block 702, the buffer memory area in buffers 221, 222 or 223 for a particular CDT e.g. 102 reaches a trigger point. For example, the trigger point may be reached when the number of outbound packets waiting to be processed reaches a predetermined number, or the number of inbound messages waiting to be processed reaches a predetermined number. Once it has been determined that a handoff is necessary due to lack of capacity, base site 110 may handoff one of the CDTs 102 to another packet-mode radio channel with excess capacity or to an idle radio channel.

The flow chart of FIG. 7 may also be entered at block 706 where a particular CDT 706 initiates a handoff request for a new packet-mode radio channel. A handoff request may be initiated by CDT 102 in response to degradation in the bit-error rate of received data, a change from a stationary condition to moving condition, degradation in the signal strength of base site transceivers 201–203, or degradation in access to or capacity of the packet-mode radio channel.

Next, at block 704, base site 110 generates a message to cellular switch 140 informing it to set up a connection to a new packet-mode radio channel and trunk or port to the corresponding PAP 152 or 153 in preparation for handoff of CDT 102. Then, at block 708, cellular switch 140 informs the corresponding PAP 152 or 153 of the new trunk for CDT 102. The corresponding PAP 152 or 153 redirects traffic for CDT 102 to the new trunk. Next, at block 710, cellular switch 140 indicates to base site 110 that the connection is made ready for the handoff. Then, at block 712, base site 110 sends a handoff message to CDT 102. Next, at block 714, CDT 102 acknowledges the handoff message on the new packet-mode radio channel. Then, at block 716, the packet-mode call continues on the new packet-mode radio channel; and thereafter the process of FIG. 7 ends.

Figure 8:
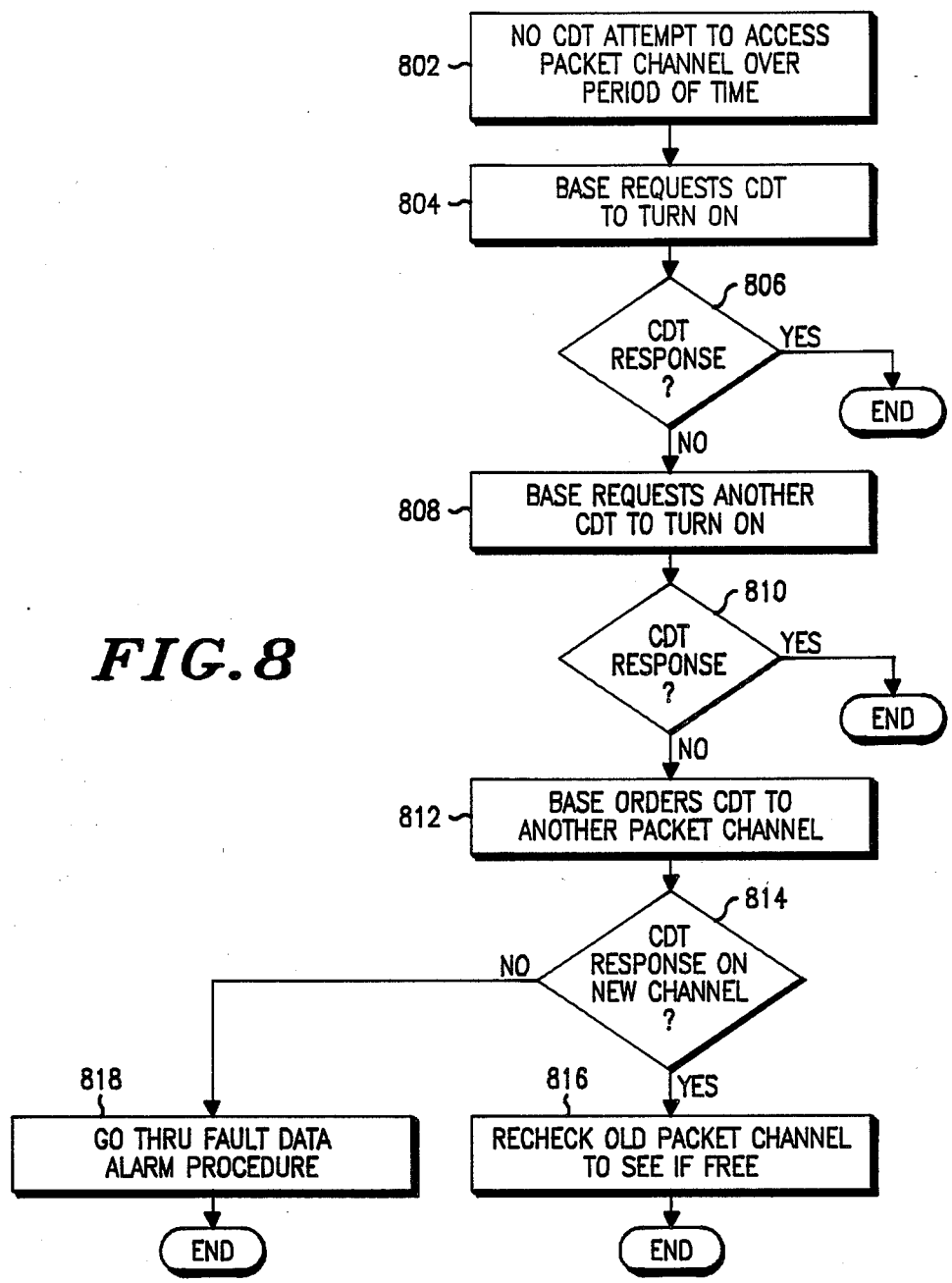
FIG. 8 is a flow chart for the process used by the base site 110 in FIG. 1 for detecting data traffic overload on the inbound packet-mode radio channel.

Referring to FIG. 8, there is illustrated a flow chart for the process used by the base site 110 in FIG. 1 for detecting data traffic overload on the inbound packet-mode radio channel. Entering at block 802, base site 110 determines that substantially none of the active CDTs 102 have attempted to access their corresponding packet-mode radio channel over a period of time (e.g. the number of inbound data packets received is less than a predetermined number). Next, at block 804, base site 110 requests that a particular CDT 102 turn on. Then, at decision block 806, a check is made to determine if the polled CDT 102 has responded. If so, YES branch is taken and the process of FIG. 8 ends. If the polled CDT 102 has not responded, NO branch is taken from decision block 806 to block 808, where base site 110 requests that another CDT 102 turn on. A failure of the initially polled CDT 102 to respond may indicate that the packet-mode radio channel is overloaded to the point where that CDT 102 is not able to access the packet-mode radio channel. In order to confirm that the packet-mode radio channel is overloaded, base site 110 polls at least two CDTs 102.

Next, at decision block 810, a check is made to determine if the polled CDT 102 has responded. If so, YES branch is taken and the process of FIG. 8 ends. If the polled CDT 102 has not responded, NO branch is taken from decision block 810 to block 812, where base site 110 orders a particular CDT 102 to another packet-mode radio channel of its transceivers 201–203. At this point, it is assumed that the packet-mode radio channel is overloaded and it is necessary to handoff one or more CDTs to another packet-mode radio channel. Next, at decision block 814, a check is made to determine if the transferred CDT 102 has acknowledged arrival on the new packet-mode radio channel. If so, YES branch is taken to block 816, where the old packet-mode radio channel is checked again as explained above to confirm that it is now free; and thereafter the process of FIG. 8 ends. If the transferred CDT 102 has not responded, NO branch is taken from decision block 814 to block 818, where base site 110 goes through a fault data alarm procedure to determine if there is a fault in the packet-mode radio channels and associated transceivers 201–203; and thereafter the process of FIG. 8 ends.

Figure 9:
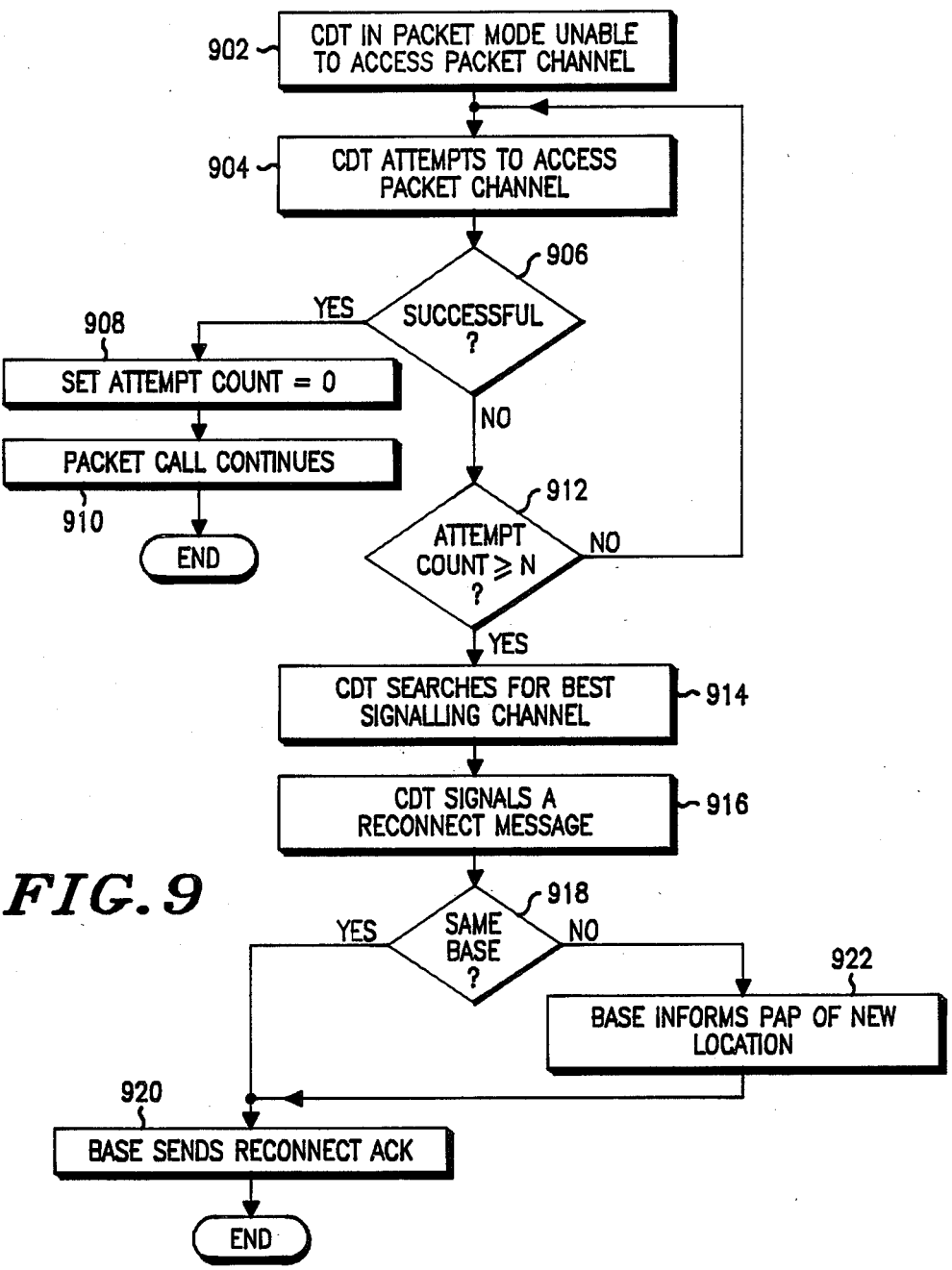
FIG. 9 is a flow chart for the process used by the cellular data telephone 102 in FIG. 1 for reconnecting a packet-mode call when it is unable to access a packet-mode radio channel.

Referring to FIG. 9, there is illustrated a flow chart for the process used by CDT 102 in FIG. 1 for reconnecting a packet-mode call when it is unable to access a packet-mode radio channel. Entering at block 902, CDT 102 determines that it is unable to access their corresponding packet-mode radio channel over a period of time. Next, at block 904, CDT 102 attempts to access the packet-mode radio channel again. Then, at decision block 906, a check is made to determine if the access attempt was successful. If so, YES branch is taken to block 908, where the unsuccessful access attempt count is set to zero. Then, at block 910, the packet-mode call continues on the packet-mode radio channel; and thereafter the process of FIG. 9 ends.

If the access attempt was unsuccessful, NO branch is taken from decision block 906 to block 910, where a check is made to determine if the access attempt count is greater than the variable N, the maximum number of allowed unsuccessful access attempts. If not, NO branch is taken back to block 904 to repeat the blocks 904 and 906. If the access attempt count is greater than the variable N, YES branch is taken from decision block 912 to block 914, where CDT 102 searches for the best signaling channel of all surrounding base sites 110. Next, at block 916, CDT 102 sends a reconnect message on the signaling channel of the selected base site 110.

Then, at decision block 918, a check is made to determine if CDT 102 has selected the same base site 110 which it was previously using. If not, NO branch is taken to block 922 where the selected base site 110 informs the corresponding PAP 152 or 153 of the new routing of CDT 102. Next, at block 920, the selected base site 110 sends a reconnect acknowledgement message to CDT 102; and thereafter the process of FIG. 9 ends. If CDT 102 has selected the same base site 110, YES branch is taken from decision block 918 to block 920, where base site 110 sends a reconnect acknowledgement message to CDT 102; and thereafter the process of FIG. 9 ends.

The flow charts in FIGS. 3, 4, 5, 6 and 7 provide a detailed description of the process steps executed by the corresponding processing circuitry of CDT 102, cell site 110, and cellular switch 140 in FIG. 1. By way of analogy to an electrical circuit diagram, the flow charts in FIGS. 3, 4, 5, 6 and 7 are equivalent to a detailed schematic of an electrical circuit where provision of the part values for electrical circuit components in the electrical schematic corresponds to provision of computer instructions for blocks of the flow charts. Thus, the coding of the process steps of these flow charts into instructions of suitable commercially available computers is a mere mechanical step for a routineer skilled in the programming art.

In summary, a unique packet-switched cellular telephone system has been described that accommodates multiple data calls on a packet-switched radio channel. The improved packet-switched cellular telephone system has a plurality of packet-switched radio channels for providing packet-switched data services to cellular data telephones. According to a novel feature of the improved packet-switched cellular telephone system, data calls may be handed off from one packet-switched radio channel to another on the basis of subscriber signal strength, radio channel data packet capacity, radio channel data packet traffic, and/or subscriber data packet throughput. Therefore, while a particular embodiment of the present invention has been shown and described, it should be understood that the present invention is not limited thereto since other embodiments may be made by those skilled in the art without departing from the true spirit and scope thereof. It is thus contemplated that the present invention encompasses any and all such embodiments covered by the following claims.

I claim:

1. A cellular telephone system for switching telephone calls between cellular telephones and a landline network and switching data between the cellular telephones and a data network, each one of the cellular telephones generating a voice radio channel request to request voice service and generating a data radio channel request to request data service, comprising:

a plurality of base sites each including: transceiver means having at least one signaling radio channel for receiving the voice radio channel requests and the data radio channel requests from the cellular telephones, and having voice radio channels and shared data radio channels for communications with the cellular telephones, each of the shared data radio channels capable of being shared by at least two of the cellular telephones; and control means responsive to each received voice radio channel request for assigning a requesting one of the cellular telephones to one of the radio channels and responsive to each received data channel request for assigning a requesting one of the cellular telephones to one of the shared data radio channels; and switching means coupled to each of the plurality of base sites for coupling the voice radio channels to the landline network and the shared data radio channels to the data network.

2. The cellular telephone system according to claim 1, wherein said data is contained in one or more packets, and said control means includes buffer means for storing inbound packets received on the corresponding shared data radio channel by said transceiver means from an active one of the cellular telephones and storing outbound packets from said switching means for said active one of the cellular telephones, said control means reading out said inbound packets and coupling said read-out inbound packets to said switching means, and said control means reading out said outbound packets and coupling said read-out outbound packets to said transceiver means for transmission on said corresponding shared data radio channel to said active one of the cellular telephones.

3. The cellular telephone system according to claim 1, wherein said data is contained in one or more packets, and said control means of a first one of the plurality of base sites monitors the number of inbound packets received from all active ones of the cellular telephones in a predetermined time interval and initiates handoff of one of said active ones of the cellular telephones to another one of the plurality of base sites when the number of inbound packets received at said first one of the plurality of base sites in the predetermined time interval is less than a predetermined number.

4. The cellular telephone system according to claim 1, wherein said control means of a first one of the plurality of base sites monitors the signal strength and bit-error rate of data received from an active one of the cellular telephones and initiates handoff of said active one of the cellular telephones to another one of the plurality of base sites when the signal strength at said first one of the plurality of base sites is less than a predetermined signal strength or when the bit-error rate at said first one of the plurality of base sites is greater than a predetermined bit-error rate.

5. A packet-switched cellular telephone system for switching telephone calls between cellular telephones and a landline network and switching data packets between the cellular telephones and a data network, each one of the cellular telephones generating a voice radio channel request to request voice service and generating a packet-mode radio channel request to request data service, comprising:

a plurality of base sites each including: transceiver means having at least one signaling radio channel for receiving the voice radio channel requests and the packet-mode radio channel requests from the cellular telephones, and having voice channels and shared packet-mode radio channels for communications with the cellular telephones, each of the shared packet-mode radio channels capable of being shared by at least two of the cellular telephones; and control means responsive to each received voice radio channel request for assigning a requesting one of the cellular telephones to one of the voice radio channels and responsive to each received packet-mode radio channel request for assigning a requesting one of the cellular telephones to one of the shared packet-mode radio channels;

packet access point means for multiplexing packets from the shared packet-mode radio channels to the data network and demultiplexing packets from the data network to said shared packet-mode radio channels; and switching means coupled to each of the plurality of base sites for coupling the voice radio channels to the landline network and the shared packet-mode radio channels to said packet access point means.

6. The packet-switched cellular telephone system according to claim 5, wherein said control means includes buffer means for storing inbound data packets received on the corresponding shared packet-mode radio channel by said transceiver means from an active one of the cellular telephones and storing outbound data packets from said switching means for said active one of the cellular telephones, said control means reading out said inbound data packets and coupling said read-out inbound data packets to said switching means, and said control means reading out said outbound data packets and coupling said read-out outbound data packets to said transceiver means for transmission on said corresponding shared packet-mode radio channel to said active one of the cellular telephones.

7. The packet-switching cellular telephone system according to claim 5, wherein said control means of a first one of the plurality of base sites monitors the number of inbound data packets received from all active ones of the cellular telephones in a predetermined time interval and initiates handoff of one of said active ones of the cellular telephones to another one of the plurality of base sites when the number of inbound data packets received at said first one of the plurality of base sites in the predetermined time interval is less than a predetermined number.

8. The packet-switched cellular telephone system according to claim 5, wherein said control means of a first one of the plurality of base sites monitors the signal strength and the bit-error rate of inbound data packets received from an active one of the cellular telephones and initiates handoff of said active one of the cellular telephones to another one of the plurality of base sites when the signal strength at said first one of the plurality of base sites is less than a predetermined signal strength or when the bit-error rate at said first one of the plurality of base sites is greater than a predetermined bit error rate.

9. A method of handoff for use at base sites of a cellular telephone system for handing off from one of the base sites to another one of the base sites at least one of a plurality of cellular telephones each transceiving data packets and sharing a cellular packet-switched radio channel of the cellular telephone system, said method comprising the steps of:
    storing outbound data packets for each active one of the plurality of cellular telephone sin buffer means; and
    sending a handoff message to one of the active ones of the plurality of cellular telephones when the stored number of outbound data packets therefor is greater than a predetermined number.

10. A method of handoff for use at base sites of a cellular telephone system for handing off from one of the base sites to another one of the base sites at least one of a plurality of cellular telephones each transceiving data packets and sharing a cellular packet-switched radio channel of the cellular telephone system, said method comprising the steps of:
    monitoring the number of inbound packets received from all active ones of the plurality of cellular telephones sharing the cellular packet-switched radio channel to determine an inbound rate of transfer of data packets; and
    sending a handoff message to one of the active ones of the plurality of cellular telephones when the determined inbound rate of transfer of data packets is less than a predetermined inbound rate.

11. A method of handoff for use at base sites of a cellular telephone system for handing off from one of the base sites to another one of the base sites at least one of a plurality of cellular telephones each transceiving data packets and sharing a cellular packet-switched radio channel of the cellular telephone system, said method comprising the steps of:
    monitoring the number of inbound packets received from all active ones of the plurality of cellular telephones sharing the cellular packet-switched radio channel to determine an inbound rate of transfer of data packets;
    polling at least one of the active ones of the plurality of cellular telephones when the determined inbound rate of transfer is less than a predetermine inbound rate; and
    sending a handoff message to one of the active ones of the plurality of cellular telephones when the polled one of the active ones of the plurality of cellular telephones does not respond.

12. A method of handoff for use at base sites of a cellular telephone system for handing off from one of the base sites to another one of the base sites at least one of a plurality of cellular telephones each transceiving data packets and sharing a cellular packet-switched radio channel of the cellular telephone system, said method comprising the steps of:
    monitoring errors in data packets received from each active one of the plurality of cellular telephones sharing the cellular packet-switched radio channel to determine a bit-error rate therefor;
    determining the signal strength level of each active one of the plurality of cellular telephones on the cellular packet-switched radio channel; and
    sending a handoff message to one of the active ones of the plurality of cellular telephones when the determined signal strength level therefor is less than a predetermined signal strength level and the determined bit-error rate therefor is greater than a predetermined bit-error rate.

13. A method of handoff for use at base sites of a cellular telephone system for handing off from one of the base sits to another one of the base sites at least one of a plurality of cellular telephones each transceiving data packets and sharing a digital cellular radio channel of the cellular telephone system, said method comprising the steps of:
    storing outbound data packets for each active one of the plurality of cellular telephones in buffer means; and
    sending a handoff message to one of the active ones of the plurality of cellular telephones when the stored number of outbound data packets therefor is greater than a predetermined number.

14. A method of handoff for use at base sites of a cellular telephone system for handing off from one of the base sites to another one of the base sites at least one of a plurality of cellular telephones each transceiving data packets and sharing a digital cellular radio channel of the cellular telephone system, said method comprising the steps of:
    monitoring the number of inbound packets received from all active ones of the plurality of cellular telephones sharing the digital cellular radio channel to determine an inbound rate of transfer of data packets; and
    sending a handoff message to one of the active ones of the plurality of cellular telephones when the determined inbound rate of transfer of data packets is less than a predetermined inbound rate.

15. A method of handoff for use at base sites of a cellular telephone system for handing off from one of the base sites to another one of the base sites at least one of a plurality of cellular telephone each transceiving data packets and sharing a digital cellular radio channel of the cellular telephone system, said method comprising the steps of:
    monitoring the number of inbound packets received from all active ones of the plurality of cellular telephones sharing the digital cellular radio channel to determine an inbound rate of transfer of data packets;
    polling at least one of the active ones of the plurality of cellular telephones when the determined inbound rate of transfer is less than a predetermine inbound rate; and
    sending a handoff message to one of the active ones of the plurality of cellular telephones when the polled one of the active ones of the plurality of cellular telephone does not respond.

16. A method of handoff for use at base sites of a cellular telephone system for handing off from one of the base sites to another one of the base sites at least one of a plurality of cellular telephones each transceiving data packets and sharing a digital cellular radio channel of the cellular telephone system, said method comprising the steps of:
    monitoring errors in data packets received from each active one of the plurality of cellular telephones sharing the digital cellular radio channel to determine a bit-error rate therefor;
    determining the signal strength level of each active one of the plurality of cellular telephones on the digital cellular radio channel; and
    sending a handoff message to one of the active ones of the plurality of cellular telephones when the determined signal strength level therefor is less than a predetermined signal strength level and the determined bit-error rate therefor is greater than a predetermined bit-error rate.

* * * * *

UNITED STATES PATENT AND TRADEMARK OFFICE
CERTIFICATE OF CORRECTION

PATENT NO. : 4,887,265
DATED : December 12, 1989
INVENTOR(S) : Felix, Kenneth A.

It is certified that error appears in the above-identified patent and that said Letters Patent is hereby corrected as shown below:

In Column 15, line 9, please delete the word "sin" and replace with --in--.

In Column 16, line 3, please delete the word "sits" and replace with --sites--.

In Column 15, line 9, please delete the word "telephone"

and replace with --telephones--.
In column

Signed and Sealed this

Twentieth Day of November, 1990

Attest:

HARRY F. MANBECK, JR.

*Attesting Officer*  *Commissioner of Patents and Trademarks*